United States Patent [19]
Baughman et al.

[11] 3,924,694
[45] Dec. 9, 1975

[54] CHISEL PLOW

[76] Inventors: Herbert W. Baughman, Vermont, Ill. 61484; Harry G. Yetter, Colchester, Ill. 62326

[22] Filed: Feb. 14, 1974

[21] Appl. No.: 442,586

Related U.S. Application Data

[63] Continuation-in-part of Ser. No. 366,152, June 1, 1973, Pat. No. 3,812,919, which is a continuation of Ser. No. 225,180, Feb. 10, 1972, abandoned.

[52] U.S. Cl. .................. 172/413; 111/7; 172/316; 172/328; 172/417; 172/776
[51] Int. Cl.² ................ A01B 63/22; A01B 63/16; A01B 59/04
[58] Field of Search .................. 172/326–328, 172/417, 423, 776, 413, 417, 316; 280/414.5, 422; 111/6, 7

[56] References Cited
UNITED STATES PATENTS

| | | | |
|---|---|---|---|
| 2,625,090 | 1/1953 | Pursche | 172/328 X |
| 2,672,084 | 3/1954 | Forgy | 172/413 X |
| 2,691,930 | 10/1954 | Forgy | 172/328 |
| 3,148,642 | 9/1964 | Gould | 111/7 |
| 3,174,557 | 3/1965 | Newkirk | 172/417 X |
| 3,292,714 | 12/1966 | Tsuchiya et al. | 172/328 X |
| 3,517,747 | 6/1970 | Fischer | 172/417 X |
| 3,554,295 | 1/1971 | Kopaska | 172/417 X |
| 3,588,139 | 6/1971 | Bayne | 172/417 X |
| 3,658,362 | 4/1972 | Fackler et al. | 172/328 X |
| 3,742,877 | 7/1973 | Coffee | 111/6 |
| 3,777,823 | 12/1973 | Holfeld | 172/328 |
| 3,812,919 | 5/1974 | Baughman et al. | 172/328 |

Primary Examiner—Edgar S. Burr
Assistant Examiner—Steven A. Bratlie
Attorney, Agent, or Firm—Mann, Brown, McWilliams & Bradway

[57] ABSTRACT

A rigid wheeled frame supporting or carrying gang type, earth-engaging and working chisel or shovel plow, wherein the wheel mounts are vertically adjustable and lockable in adjusted position with relation to a traversed surface or earth to be, or being worked, and cultivated; the frame, in all positions of vertical adjustment being maintained level and the draft-tongue of the wheeled frame concurrently automatically adjusted to compensate for effected changes in the particular height adjustment of both the frame and earth-working devices carried thereby, thus assuring proper hitching to, and towing, by a tractor or other draft vehicle with the frame and earth-working devices level, when active and/or inactive, when traveling to or from a cultivating project over a rough or uneven way and having adjustable brackets providing multiple mounts for supporting a plurality of cultivating devices at equally spaced intervals. The invention includes a frame structure adapted to mounting ground working implements in equally spaced disposition on the frame with mountings for fertilizer applying apparatus and multiple assist devices for relative vertical adjustment between the frame and wheel mounts.

3 Claims, 13 Drawing Figures

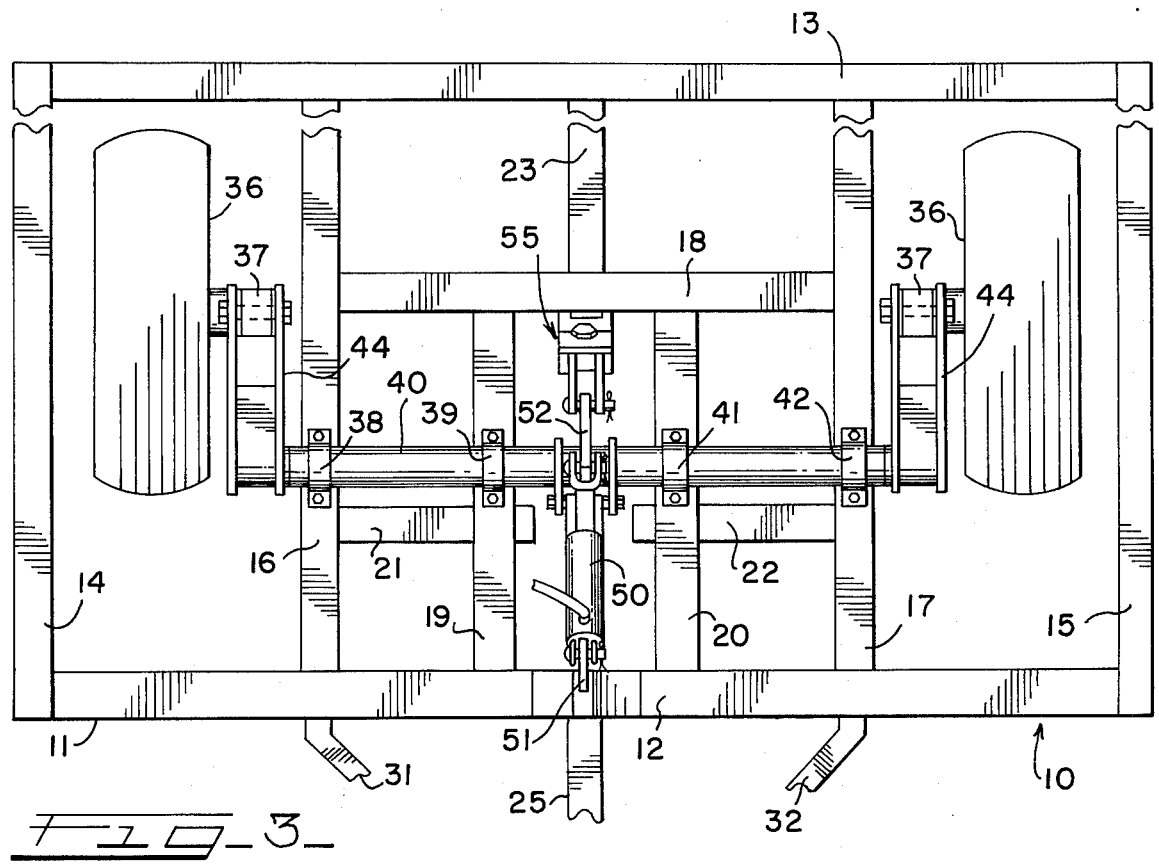
FIG_3
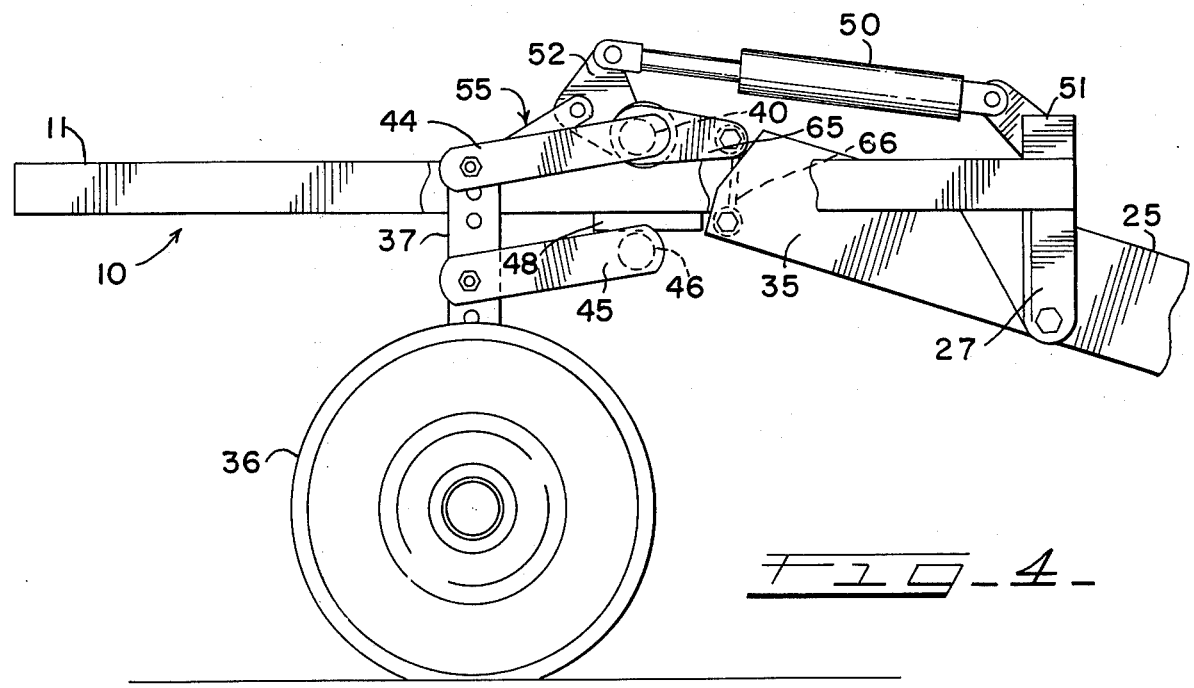
FIG_4

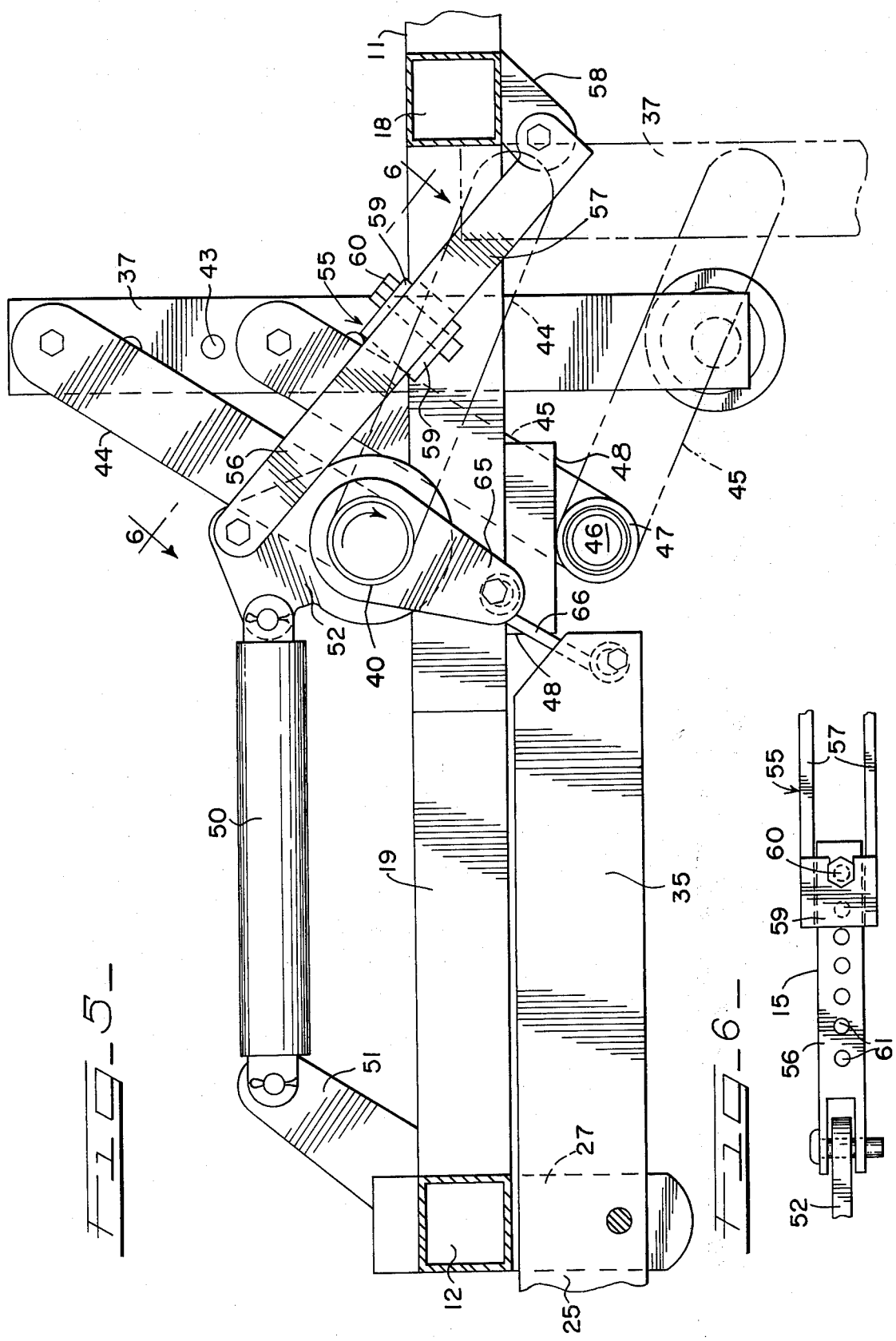

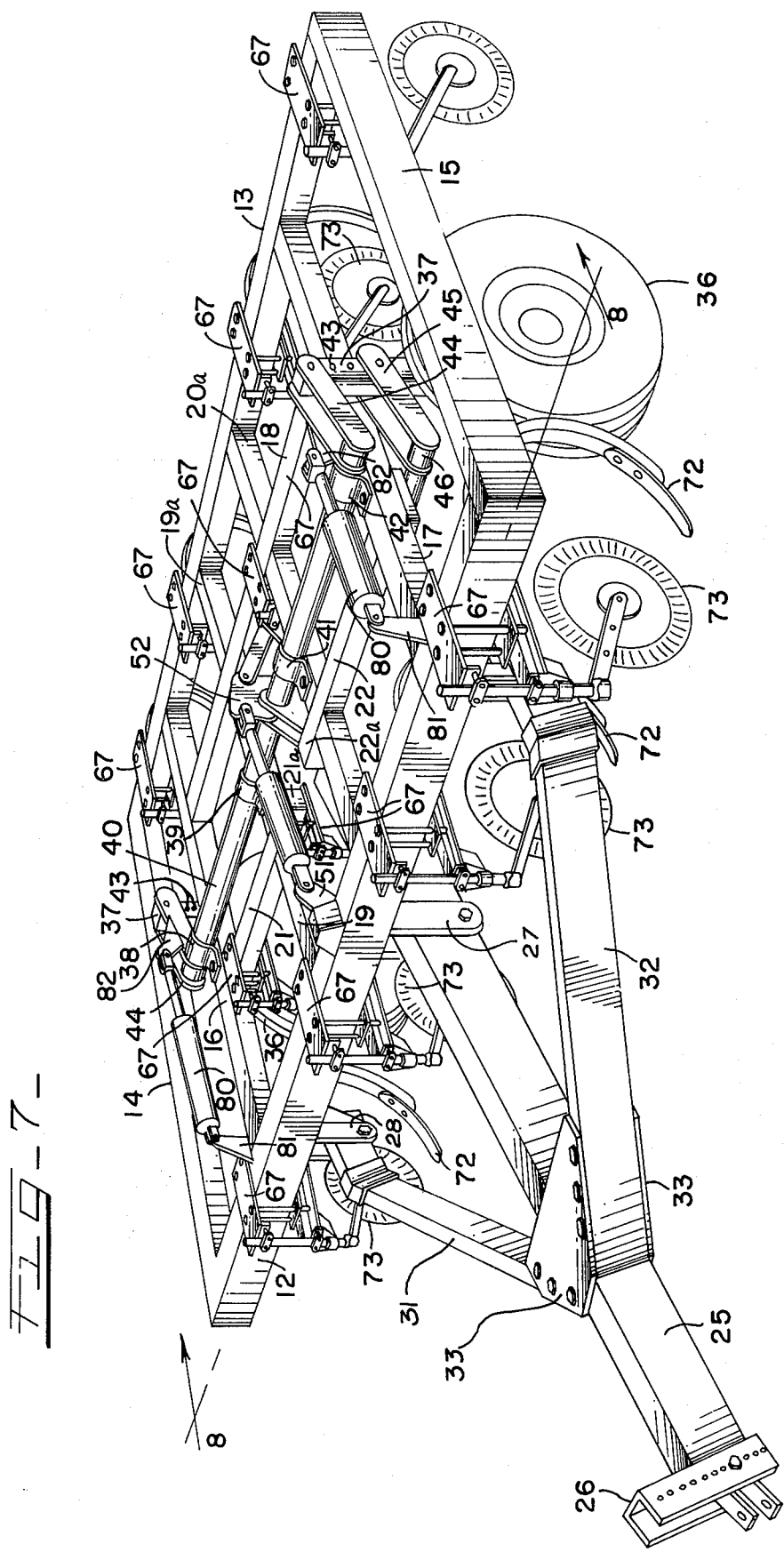

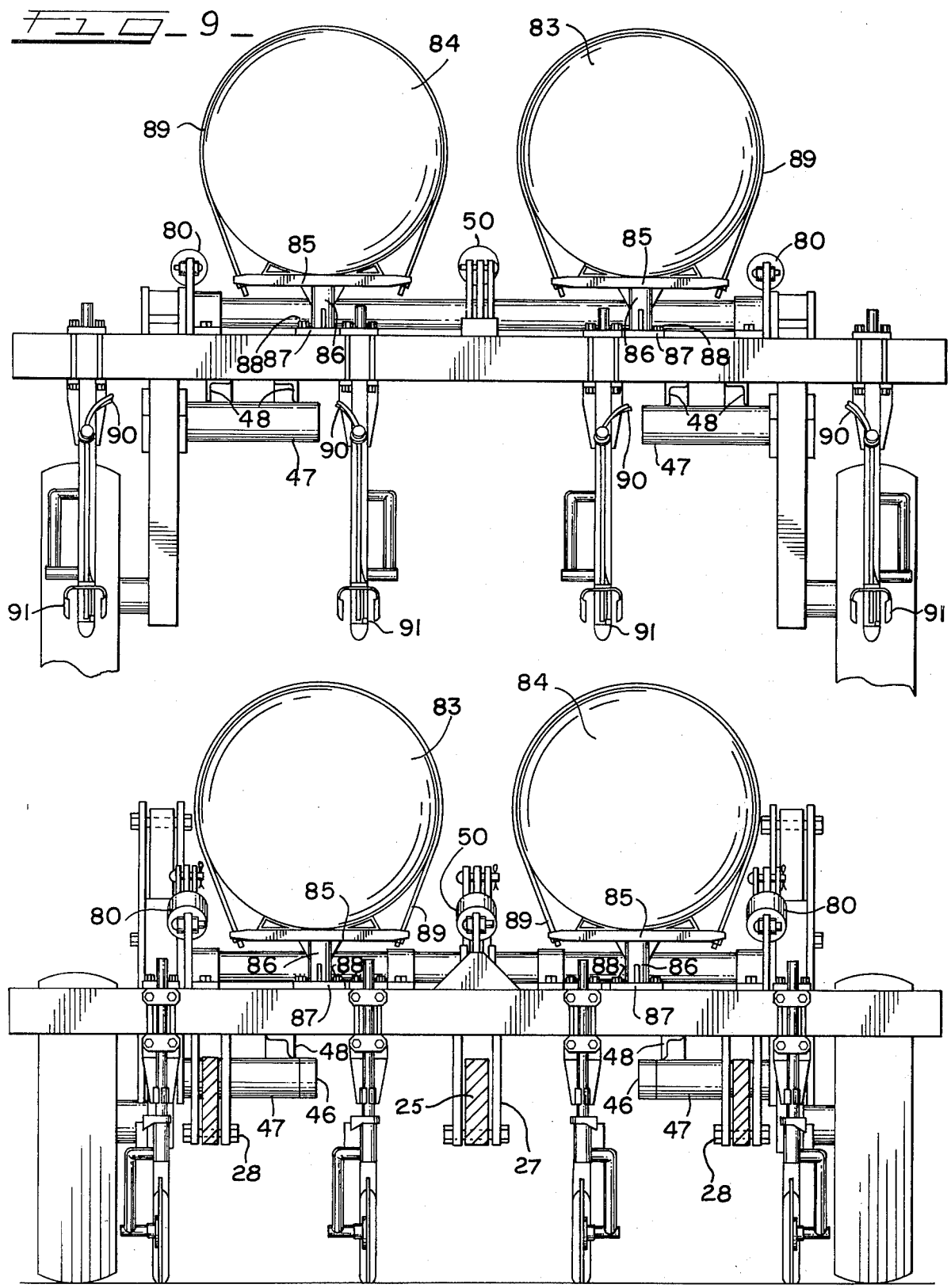

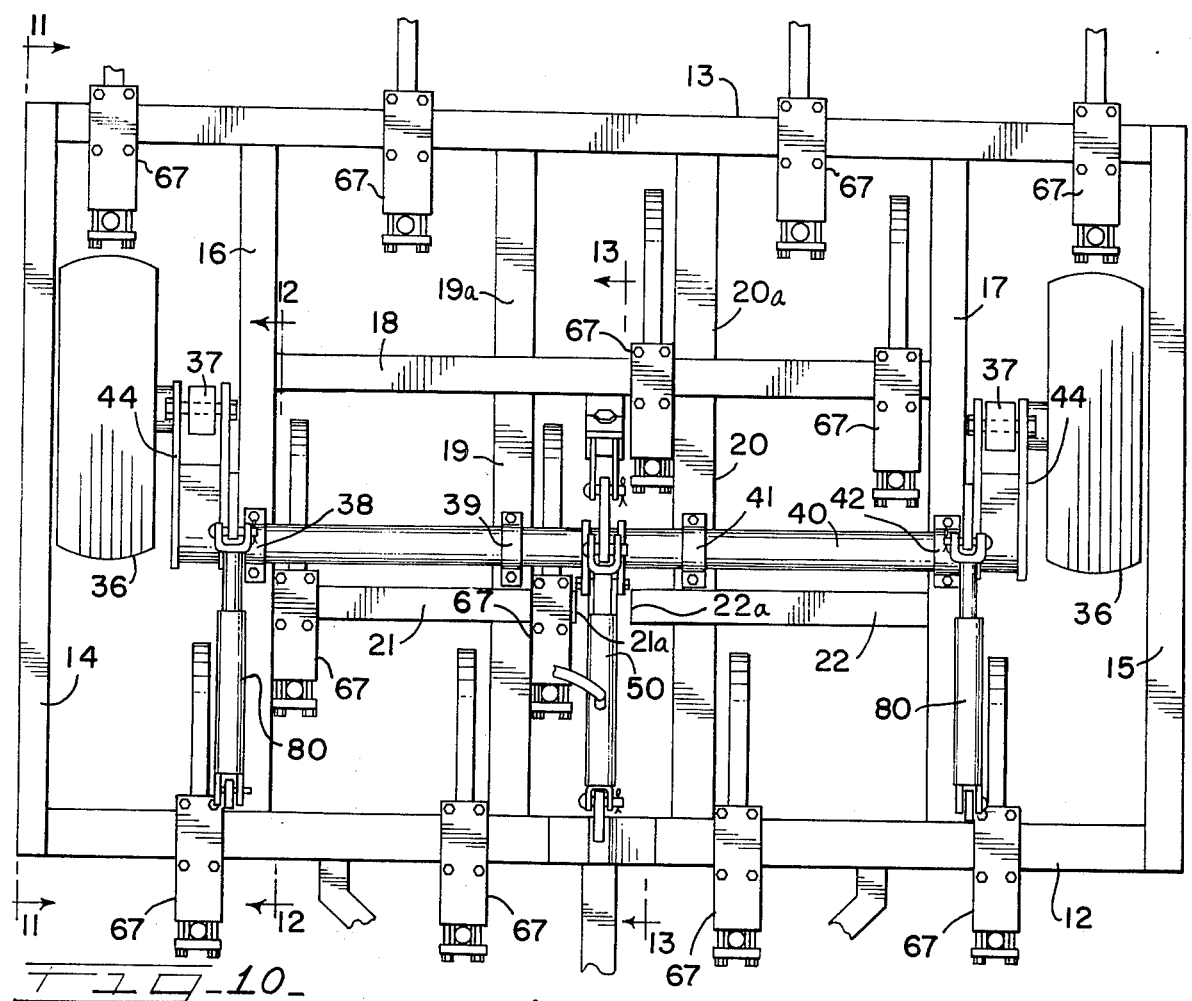
FIG_10_
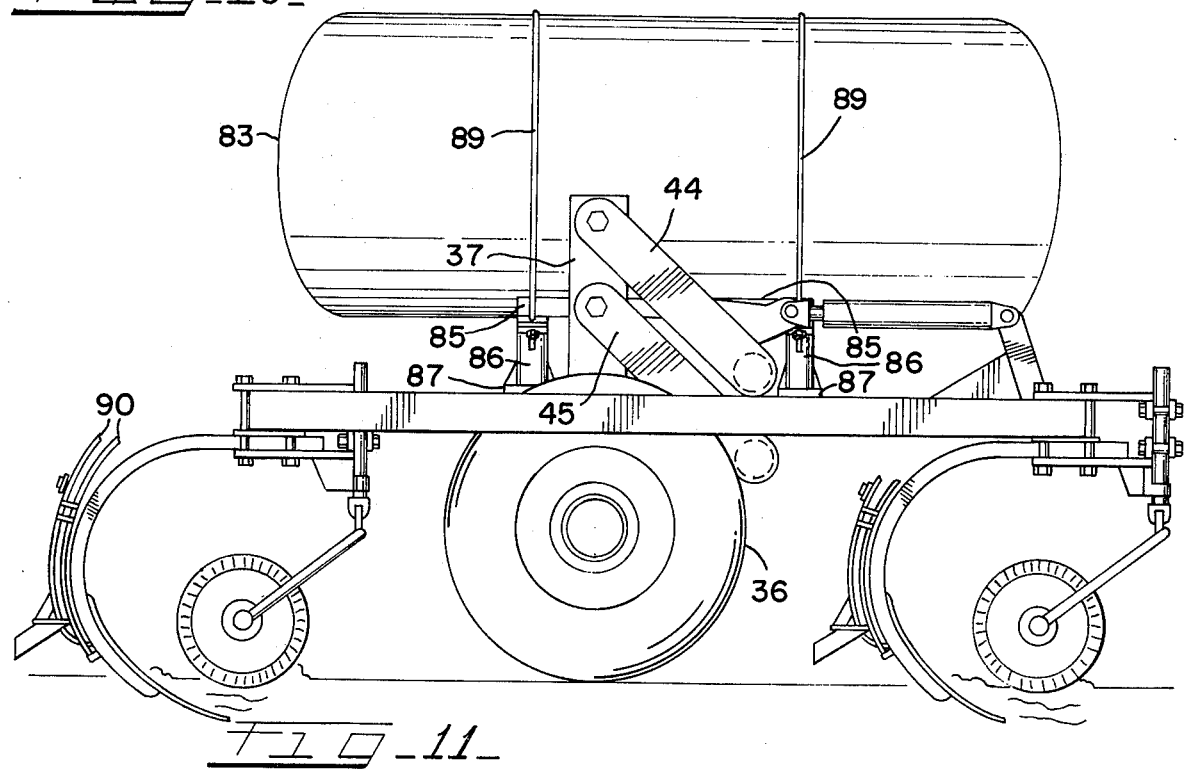
FIG_11_

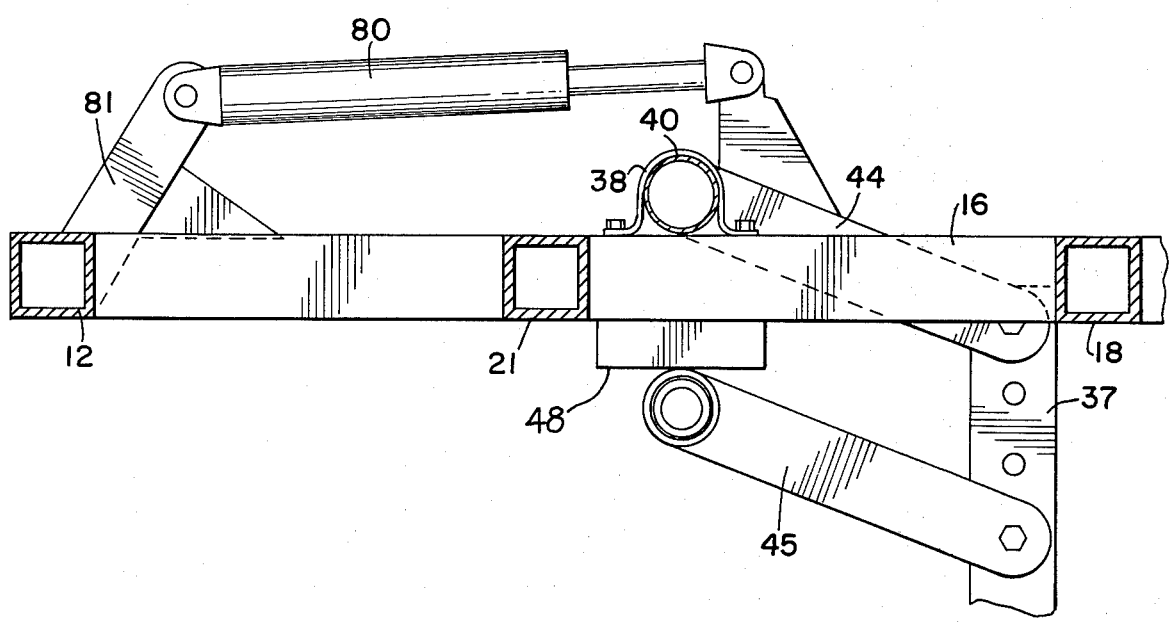
FIG_12_
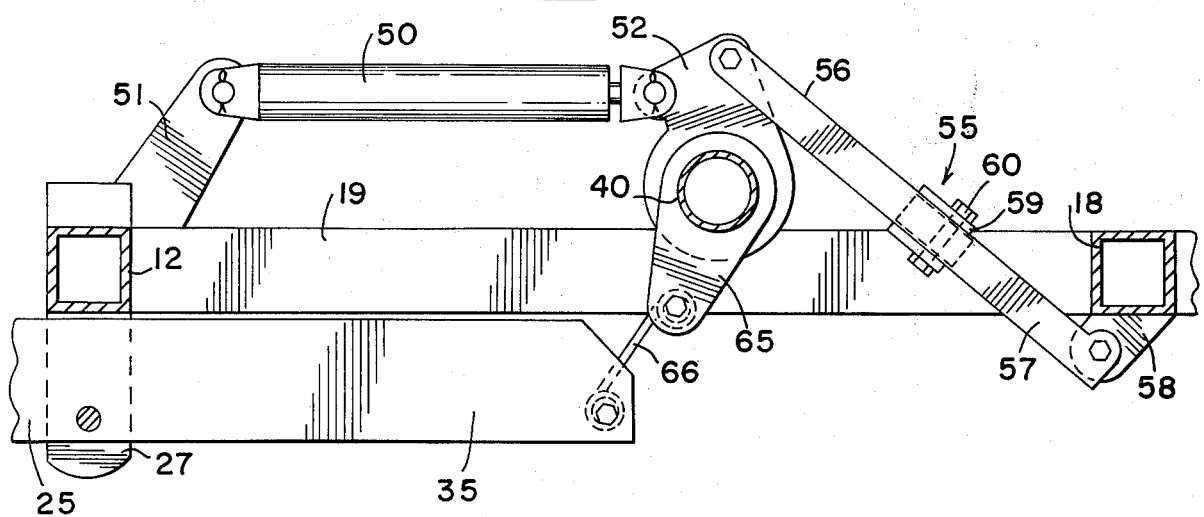
FIG_13_

CHISEL PLOW

This application is a continuation-in-part of our co-pending application Ser. No. 366,152, filed June 1, 1973, U.S. Pat. No. 3,812,919 which is a continuation of our application Ser. No 225,180, filed Feb. 10, 1972, now abandoned, both entitled CHISEL PLOW.

FIELD OF THE INVENTION

This invention relates, generally, to improvements in wheeled plows or cultivators, particularly, to the wheel-equipped rigid frame type, carrying a multiplicity of appropriate earth-working and cultivating devices, as for example, so-called chisel or shovel plows, etc., provided with vertically adjustable rotary crank-axle operated wheel mounts and cultivator carrying frame.

BACKGROUND OF THE INVENTION

In the field of agriculture, specifically, in cultivation of the soil of fields, wheeled cultivators or tillage devices are frequently required to travel to and from their places of normal storage to and from areas or fields to be cultivated, over rough and uneven surfaces rendering it beneficial, if not necessary, that the cultivating devices carried thereby shall be supported thereon so that they will be prevented from contact or engagement with the traversed surfaces lest they be damaged or impede travel; also, that the bodies or frames thereof shall be maintained in substantially level relation to the surface being traversed and to the towing tractor or other draft means at heights fully sufficient to prevent the aforesaid detrimental contact or engagement of the cultivating devices with the surfaces of the traversed ways or obstacles encountered during crossing, as well as assure a maximum effective towage plus effective vertical adjustment of the carried earth-working devices to the required soil-working or cultivating depths.

While attempts have heretofore been made to eliminate or obviate these difficulties and to comply with and assure the stated requirements, and earth tilling efficiencies, they have insofar as I am aware, been generally unsuccessful, if not impractical.

SUMMARY OF THE INVENTION

In order to eliminate the above, the present invention has evolved. It is characterized, firstly, in that it provides a novel mechanism for selectively and automatically raising or lowering its body frame to the desired or required height; secondly, it retains the frame in level or substantially level relation to the ground or other surface, thirdly, the cultivating or tilling devices will be carried in effective working or nonworking relation to the soil, as for example, said devices may be vertically and selectively adjusted so that they will engage and till the field soil to the required depth in equally spaced relationship and, when traveling to or from a field site, will be prevented from contacting irregular traversed surfaces with resultant damage thereto; fourthly, it provides a novel construction of wheel lift concurrently operable with the operation of the first characterization so that the raising and/or lowering of said frame will be effected, and fifthly, the draft-tongue connecting the wheeled frame and cultivating devices to a tractor or other draft means will be automatically adjusted to compensate for the raising or lowering of said frame with relation thereto, hence, assuring satisfactory towing effectiveness.

OBJECTS OF THE INVENTION

It is an important object of the invention to provide an automatically operable leverage arrangement and construction by means of which the earth-working means carried by the wheeled carriage can be adjusted vertically to a particularly desired height and so retained whereby to effect their depth of engagement with the field soil being cultivated, to the required or desired extent.

It is also an object of the invention to provide laterally adjustable brackets on the frame of the earth-working apparatus adapted to secure cultivating devices in multiple at each bracket and provide for vertical adjustment of at least one of such devices at each bracket and with the several devices spaced at equal intervals and the multiple devices at each bracket in alignment.

DESCRIPTION OF THE DRAWINGS

Other and equally important advantages, benefits, and objectives of the invention will be apparent from a reading and an understanding of the following description in connection with the accompanying drawings, wherein:

FIG. 3 is a plan view of the plow arrangement and vertical adjustment mechanism;

FIG. 4 is a detail view of the lift mechanism illustrating the raised position;

FIG. 5 is also a detail view of the lift mechanism but to larger scale illustrating the lowered position and indicating the raised position in broken lines;

FIG. 6 is a detail view taken from the lines 6—6 of FIG. 5 showing the telescopic motion limiting device providing a limit stop to rotation of the crank axle when lowering the frame;

FIG. 7 is a general perspective view of a plow arrangement incorporating frame structure adapted to mount earth working element in equally spaced relationship, and utilizing multiple assist mechanism for adjusting the frame and wheel mounts;

FIG. 8 is a front elevational view of the plow with fertilizer tanks supported in saddles mounted on the plow frame;

FIG. 9 is a rear elevational view of the plow and saddle mounted fertilizer tank arrangement;

FIG. 10 is a plan view of the plow frame illustrating the various frame elements and the equal spacing of general working implements as well as the multiple power activated devices for adjusting the frame and wheel mounts;

FIG. 11 is a side elevational view of the plow arrangement with the fertilizer tanks thereon with the frame adjusted to a lower operating position, and FIGS. 12 and 13 are sectional views taken on the lines 12—12 and 13—13 respectively, of FIG. 10 and showing details of the power circuit mechanism.

DESCRIPTION OF PREFERRED EMBODIMENT

Figure 1:
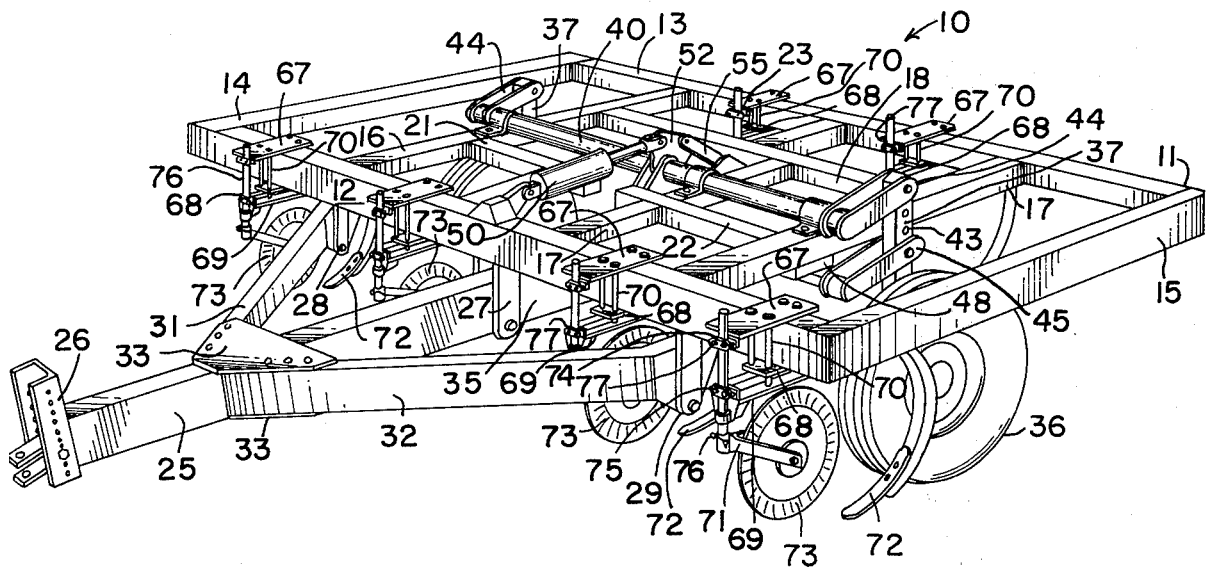
FIG. 1 is a general perspective view of a gang type plow arrangement constructed in accordance with this invention and incorporating colter and chisel type cultivator devices.
Figure 2:
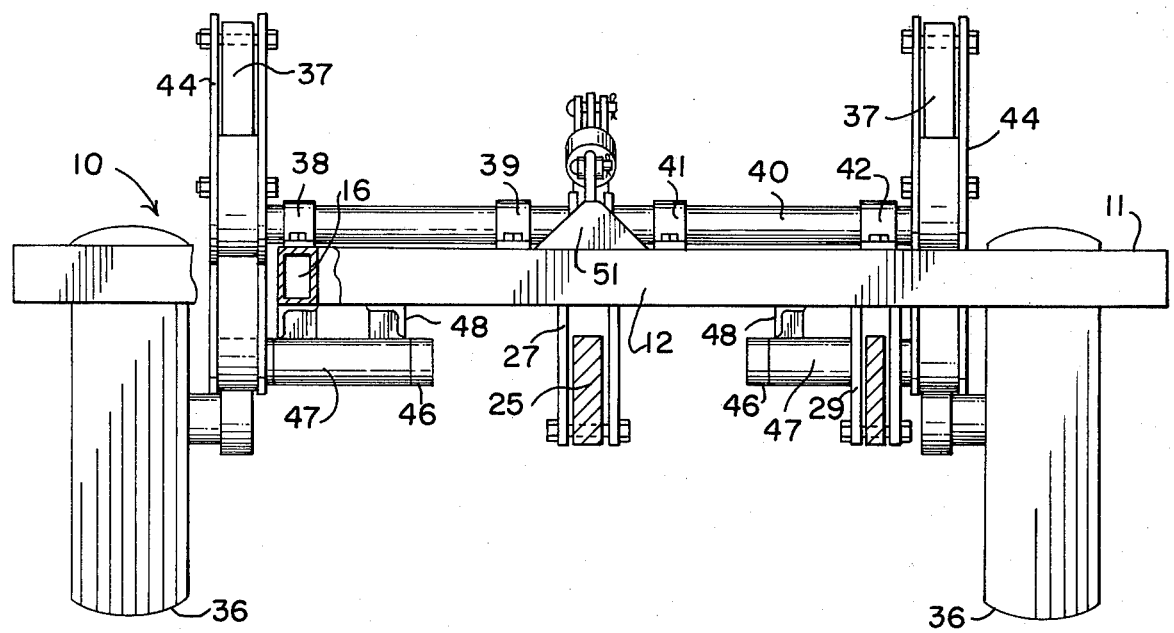
FIG. 2 is a front elevational view to enlarged scale with portions broken away and showing the vertical adjustment mechanism.

In the drawings 10 represents generally a gang type cultivator or plow having a rigid frame 11 including transverse members 12 and 13 connected by longitudinal frame members 14 and 15 at the respectively opposite sides and intermediate longitudinal members 16 and 17. An intermediate transverse frame member 18 connects the longitudinals 16 and 17. Longitudinal members 19 and 20 extend between the member 18 and the transverse member 12. These members 19 and 20 are connected by means of short intermediate transverse framing members 21 and 22 to the intermediate longitudinal frame members 16 and 17 respectively. A short longitudinal member 23 connects the frame members 13 and 18. The structure thus described provides a rigid frame for mounting the cultivator devices and raising and lowering mechanisms and enables the cultivator devices to be mounted in relation to the frame structure such that the cultivators are equally spaced laterally to break the soil in equally spaced rows and avoid forces tending to exert a pull in a sidewise direction.

A drawbar or draft tongue 25, having an adjustable hitch or tow-bar connection 26 at its front end, is pivotally mounted on the rigid frame 11 by means of depending brackets 27, at the center, and 28 and 29 at laterally spaced points secured at the underside of the transverse frame member 12. The structure of the drawbar includes the central longitudinal draft tongue 25, which is pivotally carried in the central depending bracket 27, and angularly disposed struts 31 and 32, secured at their converging ends to the draft tongue 25 at a point behind the front hitch 26 by means of upper and lower gussets 33. The struts 31 and 32 extend respectively at an angle to the depending brackets 28 and 29 where they are pivotally supported, thus bracing the draft tongue 25 against lateral deflection and providing three spaced points of support for the draft tongue structure with the pivotal connections at the brackets, 27, 28 and 29 all on the same axis. The draft tongue 25 has an integral extension 35 extending rearwardly of its pivotal connection to the supporting bracket 27.

Supporting wheels 36 are mounted on hubs carried by wheel mounts 37 which are disposed vertically at all times. The rigid frame 11 is carried on the wheel mounts 37 and is so mounted as to provide for vertical adjustment relative to the ground. A transversely extending rotatable crank axle 40 is mounted on the longitudinal frame members 16, 19, 20 and 17 by means of bearing brackets 38, 39, 41 and 42 which rigidly support the crank axle in the rigid frame 11 for rotary motion only. At respectively opposite ends of the crank axle 40 a parallel link assembly 44 is rigidly fixed to the axle for movement therewith when the axle is rotated. The free end of these link assemblies is pivotally connected with the respective wheel mounts 37 so that when the crank axle is rotated the frame 11 is moved upwardly or downwardly relative to the ground supporting the wheels 36.

The wheel mounts 37 are maintained vertical and the frame 11 in a generally horizontal level condition through the medium of a second pair of parallel links 45 pivotally connected at their free ends to the wheel mounts 37 and at their inner ends pivotally mounted on the rigid frame 11. The links 45 are disposed parallel to the links 44 so that the pair of parallel links at the respective wheel mounts 37 function like a parallelogram to maintain their wheel mounts vertical and thus keep the rigid frame 11 horizontally level. The links 45 at their respective inner ends are rigidly mounted in a relatively short axle 46 which is rotatively supported in bearing brackets 47 carried by single bracket structures 46 rigidly secured at the underside of frame structure 11. The pivotal axis of the axles 46 carrying the links 45 is located directly on the vertical centerline with the crank axle 40 so that with all of the links 44 and 45 being of the same length a true parallelogram effect is obtained. The wheel mounts 37 may be positioned initially relative to the frame 11 by means of holes 43 which enable adjustment of the wheel mounts by positioning the parallel links 44 and 45 for pivotal connection to the pair of holes in each mount dictated by the desired relative positioning of the frame 11 and wheels 36.

The crank axle 40 is rotated by power means comprising a hydraulic cylinder mechanism 50 having communication with a suitable source of hydraulic pressure means. The cylinder end of this mechanism is pivotally mounted on a bracket structure 51 rigidly fixed to the transverse frame member 12 at its upper side thus forming an abutment against which the cylinder mechanism reacts in operation. The plunger end of the cylinder mechanism is pivotally connected to an upper crank arm 52 rigidly mounted on the crank axle 40 which thus rotates the crank axle according to the direction of actuation of the cylinder mechanism 50. A stop device is provided to limit the rotation of the crank axle and associated devices in the direction of operation which lowers the frame 11 relative to the wheels 36 and supporting ground surface. Thus stop device is best illustrated in FIGS. 5 and 6 and comprises a telescoping link mechanism generally designated 55. One end link member 56 of this device is pivotally connected to the upper crank arm 52 on crank axle 40 while the opposite end structure 57, adapted to receive and embrace the end link 56 in telescoping relation, is pivotally mounted on a bracket 58 rigidly secured to the underside of the transverse frame member 18. End structure 57 is comprised of a pair of spaced links connected at the one end to the bracket 58 and at the end embracing the line 56 a pair of upper and lower plate members 59 rigidly connect the link members to form what might be described as a socket or opening for the reception of the link 56 into the link structure 57. These upper and lower plates 59 are recessed, as best shown in FIG. 6, and a pin 60 fixed in the link 56 after it has been entered into the link structure 57, engages the recess to limit relative movement of members 56 and 57 in an outward direction. Thus the rotation of crank axle 40 in the direction tending to extend this stop device 55 is stopped upon the pin 60 entering the recess in plates 59 and this has the effect of limiting the lowering movement of the rigid frame 11 and all of the appurtenances mounted thereon. However, the degree of limitation of this movement is adjustable by means of the plurality of openings 61 provided in the link 56 for mounting the pin 60 in any of the openings according to the amount of travel desired as dictated by the amount of vertical adjustment required to position the frame 11 in accordance with operating conditions.

Means are provided automatically to compensate for changes in the operating height of the rigid frame 11 in respect to adjustment of the draft tongue 25 whereby to position the draft tongue for proper hitching relation and connection to a towing vehicle. The rearward extension 35 is adapted to be fulcrumed about the supporting pivot bracket 27 automatically for this purpose when the crank axle 40 is rotated. The crank axle 40 is provided with a lower crank arm 65 rigidly mounted thereon and rotatable therewith. A connecting link member 66 extends between and is pivotally mounted at its respectively opposite ends on the lower crank arm 65 adjacent its free end and on the rearward extension 35 of the draft tongue 25 adjacent the rear end thereof and near the bottom of the extension. Thus, when the crank axle 40 is rotated to position, the frame 11, as desired, the draft tongue 25 is automatically and simultaneously adjusted to position the tongue for proper draft connection to the towing vehicle.

A plurality of cultivating devices is mounted on the rigid frame 11 for tilling and cultivating soil in the operation of the earth working apparatus. A bracket mounting arrangement for the cultivating device is designed to accommodate two types cultivators and is adjustable laterally on the frame 11 for proper positioning of the cultivators and in equally spaced relationship transversely of the frame structure. These brackets are each adapted to mount both a rolling colter type disc cultivator and a chisel type plow or cultivator. As best shown in FIG. 1, the brackets comprise upper and lower clamping plate members 67 and 68 and a third clamping plate 69 spaced below the lower clamping plate 68 and a plurality of clamping bolts 70. The horizontal bar portion 71 of a curved mounting bar for a chisel plow or cultivator 72 is mounted between the clamp plate 68 and the clamp plate 69 and when the bolts 70 are tightened the plates 67 and 68 are clamped on the transverse frame member 12 or 13, as the case may be, and the chisel plow mounting bar portion 71 is clamped between the lower clamp plate 68 and the third clamp plate 69 so that the entire assembly is thus rigidly mounted on the transverse frame member.

The upper clamp plate 67 and the third clamp plate 69 are also adapted for the mounting of the rolling colter plow or cultivating disc 73 in alignment with the chisel plow 72. The plates 67 and 69 are each provided with a vertically disposed front plate 74 and 75, respectively, rigidly secured thereto and in vertical alignment. The plates 74 and 75 thus afford clamping surfaces in the same plane to which the vertical bar 76 of the colter plow is adapted to be clamped. Clamp plates 77 are engaged over the bar 76 at each bracket and secured tightly by drawing up the bolts provided for that purpose.

From the foregoing it will be seen that a cultivating apparatus has been provided wherein simple and effective means enable quick and positive adjustment of the rigid frame upwardly and downwardly between raised positions for travel to and from operating locations and a lowered operative position for tilling soil at such locations. The raised portion of the frame lifts the cultivating devices clear of any ground obstructions for free travel between the operating locations while the lowered position locates the cultivating devices in proper relation to the soil to be tilled. The tow bar for the cultivating apparatus is automatically positioned for proper hitch connection to a towing vehicle where the frame is raised for towing. The cultivating devices are adjustably mounted on the fixed frame by means of brackets affording multiple mounts for a plurality of cultivating devices on each bracket. Finally, limit means are provided to control the positioning of the frame and tilling devices with respect to the depth of penetration into the soil to be utilized during tilling operations.

It is important to note that the design of the lifting mechanism of this invention is such that the chisel plows are maintained at an even depth at all times and in respect to the depth of fertilizers. As an example, with the chisel plows set for operation at a depth of ten inches in a particular type of soil, if another type of soil is encountered such that the tractor pulling the plow is incapable of pulling it at the ten inch depth it becomes necessary to raise the chisel plows to a depth of six inches. In these circumstances, all of the chisel plows would continue to operate at an even depth, both front and rear, at the adjusted depth of six inches. This is very important particularly with certain fertilizers where with this arrangement the fertilizer would continue at an even depth and thus keep gas sealed in the soil.

HITCH LEVELING OPERATION

With this arrangement the hitch always remains parallel to the ground and this is maintained at all times irrespective of the height adjustment. The result is accomplished by the lever arm arrangement of the connection of the hitch bar in the frame as best indicated in FIG. 5, and it is by means of the ratios of the lever arms 62 and 65, the connection of the levers to the hitch by link 66 and the ratio of the hitch bar suspension in the frame in regard to the length of the inner hitch bar portion 35 with respect to that of the outer hitch bar portion 25 extending beyond the plow frame to the tow bar connection 26. This is an important function in the operation of the plow particularly in the application of liquid fertilizers and just as important in an application of fertilizers such as anhydrous ammonia. It is important in applying fertilizers of these types that the feed nozzles be maintained in a position to direct the discharging fertilizer into the plowed ground, which this apparatus achieves. Otherwise, if the plow mechanisms were allowed to tilt the feed nozzles would be lifted above the ground and the fertilizers thus rendered ineffective through misdirection and actually lost.

FRAME STRUCTURE

As best shown in FIGS. 7 and 10, the frame structure of this plow arrangement is of generally rectangular form including longitudinally disposed and transversely disclosed frame members disposed to provide for the mounting of all of the plow appurtenances thereon in the relationship designed to provide for the proper functioning of all elements in total combination whereby to obtain the most efficient functioning of the plow as a whole in the various operations to which the plow is subjected. The frame includes front and rear transverse end members 12 and 13 which are connected by longitudinal side frame members 14 and 15. Longitudinal frame members 16 and 17 also connect the front and rear frame members 12 and 13 and are spaced inwardly from the respective frame members 14 and 15 to define openings for the wheel mounts supporting the frame.

The longitudinal frame members 16 and 17 are connected by a transversely extending intermediate frame member 18. This intermediate transverse frame member is connected to the front end transverse frame member 12 by intermediate longitudinal frame members 19 and 20 equally spaced upon opposite sides of the longitudinal centerline of the plow frame. The intermediate longitudinal members 19 and 20 are connected to the inside longitudinally extending frame members 16 and 17 respectively by transversely disposed frame members 21 and 22. The longitudinal frame members 19 and 20 in fact are discontinuous in that they are interrupted by the transversely disposed frame members 21 and 22 which extend through the longitudinal members to project inwardly beyond the inner sides of the respective members as at 21$^a$ and 22$^a$ with the inner ends of these transverse members spaced apart on opposite sides of the longitudinal centerline of the plow frame and thus leaves a central opening in the frame defined by the longitudinal members 19 and 20 and by the transverse frame members 12 and 18 for the reception of a central power assist mechanism for adjusting the frame and wheel mounts.

The rear transverse end frame member 13 is connected with the transversely disposed intermediate frame member 18 by a pair of longitudinally extending frame members 19$^a$ and 20$^a$ equally spaced upon opposite sides of the longitudinal centerline of the plow frame and disposed in alignment with the longitudinal frame members 19 and 20 respectively. All of the various frame members described are secured into an integrated assembly by welding all of the members together in the relationship illustrated to provide a rigid structure capable of withstanding the forces to which a plow of this type is subjected in normal usage and which affords properly located frame elements for the attachment and support of the several ground working elements arranged to provide the equal spacing of such elements necessary to the proper working of farm land. The frame structure provides properly located frame elements for mounting and attaching fertilizer tanks and for the attachment of operating devices for the power actuation of mechanisms for raising and lowering the frame relative to wheel assemblies mounted in the frame for both transport of the plow between work locations and for the actual ground working operations.

GROUND WORKING IMPLEMENTS

The plow frame described is adapted to mount and support a plurality of ground working implements such as the cultivators 72 which are shown as chisel plows. These cultivators are mounted in brackets 67 in accordance with our copending application Ser. No. 427,796, filed Dec. 26, 1973. The brackets 67 are such that they also mount colter discs 73 in alignment with the cultivators 72 in accordance with the disclosure of the copending application, and these features do not constitute a specific part of the present invention. This disclosure however provides a frame structure which facilitates the mounting of the brackets 67 thereon in a manner whereby all of the aligned cultivators 72 and colter discs 73 are so located that the ground working operation is performed at equally spaced intervals. As best revealed from an examination of FIG. 10, it will be seen that the brackets 67 mounting the cultivators and colter discs on the frame structure are all mounted on transversely extending frame members 12, 21, 21$^a$, 18 and 13 from front to rear and each of the brackets supports the cultivator and disc on the frame members in relative positions such that a separate path in the ground being worked is defined by each and these separate paths are equally spaced from each other transversely of the plow. The brackets 67 are adjustable laterally on the frame members 12, 18 and 13 so that it is readily possible to adjust the positions of the cultivators and colter discs on the respective transverse frame members to obtain the relative positioning of the earth working tools on all of the frame members from front to rear of the plow to obtain the desired equal spacing laterally of the paths defined by the tools as the plow traverses the ground. The arrangement of the brackets 67 is also capable of being varied in respect to their mounting on the various transverse frame members. The brackets are shown on the transverse frame members 12, 13, 18, 21 and 21$^a$ but where conditions warrant the brackets 67 with the associated chisel plows and colter discs might be removed from their positions on any one or more of these frame members and mounted in position on other transverse members such as the members 22 and 22$^a$. The brackets 67 of course may be adjusted laterally of the frame on any of the transverse members other than the relatively short extension members 21$^a$ and 22$^a$.

WHEEL MOUNT AND FRAME ADJUSTMENT

The frame arrangement provides a structure especially adapted to the disposition of the frame adjusting and wheel suspension mechanisms and the operative mounting thereof on the frame. The suspension is generally similar to the arrangement disclosed in our earlier copending application, Ser. No. 366,152, above identified, but includes improvements not contemplated by that disclosure. The present structure incorporates a crank axle 40 rotatively mounted on the top of the frame structure by means of bracket bearings 38, 39, 41 and 42 captively supporting the crank axle on the longitudinal frame members 16, 19, 20 and 17 respectively. At respectively opposite ends of the crank axle a longitudinally extending link 44 is rigidly fixed to the axle for movement therewith when the crank axle is rotated. The crank axle 40 is supported in the bearings 38, 39, 41 and 42 on the frame structure for rotary motion only and the free end of the longitudinally extending links 44 are pivotally connected respectively with a wheel mount 37 located at each side of the frame between the longitudinal frame members 14 and 16 and between similar frame members 17 and 15 whereby when the crank axle 40 is rotated the links move the wheel mounts 37 vertically and thereby move the rigid frame structure upwardly or downwardly relative to ground supporting wheels 36.

The vertical positions of the wheel mounts 37 and the generally longitudinal position of the frame structure relative thereto is maintained by a second pair of longitudinally extending links 45 disposed respectively at opposite sides of the frame in parallel relation to the respective links 44. The parallel links 45 are each pivotally connected at the free ends to the respective vertical wheel mounts 37 and at their opposite ends are pivotally mounted on the frame structure at the underside thereof. The longitudinal links 45 at the ends thereof mounted at the underside of the frame are each rigidly connected to a short axle member 46 and each of these axle members is rotatively supported in a transversely extending framing sleeve 47 that is rigidly mounted at the underside of the frame by means of longitudinally extending angle brackets 48. The bearing sleeves 47 and these angle bracket structures are connected together by welding and the bracket structures are secured to the underside of the frame preferably by welding.

By this parallel relationship of the longitudinal links 44 and 45 at each side of the wheel mounted plow frame the links function as a parallelogram and thereby maintains the wheel mounts in vertical position while maintaining the frame structure in a horizontal position with this relative positioning remaining true during all relative vertical movements. The pivotal axis of the aligned axles 46 is located directly in vertical alignment with the centerline of the crank axle 40 and all of the parallel links 44 and 45 are of the same length so that a true parallelogram action is thereby obtained. The wheel mounts 37 are each provided with a plurality of vertically spaced holes 43 by means of which the initial relative positioning of the frame structure and wheel mounts may be obtained by locating the free ends of the links 44 and 45 in the pair of holes of each wheel mount at opposite sides of the frame to position the frame vertically relative to the wheels 36 as desired.

HYDRAULIC ACTUATION

Rotation of the crank axle 40 is power actuated and is obtained by means of hydraulic cylinder mechanism operatively connected with a suitable source of hydraulic pressure developing means. The hydraulic cylinder device 50 is mounted generally on the longitudinal centerline of the frame structure and has pivotal connections at one end with a bracket structure 51 rigidly mounted at the front of the frame on transvers frame members 12 and secured by welding. The bracket structure 51 forms a rigid abutment on the frame against which the hydraulic cylinder 50 reacts in operation. The plunger of the cylinder 50 is pivotally connected to an upper crank arm 52 fixed on the crank axle 40 and rigidly secured thereto by welding so that hydraulic actuation of the cylinder 50 rotates the crank axle in accordance with the direction in which the cylinder is actuated. The relationship of this crank arm 52 to the operation of the crank arm 40 and the vertical actuation of the wheel mounts 37 by the parallel links 44 and 45 is best revealed in FIG. 5. Here it will be seen that maximum rotation of the crank axle 40 is limited by a stop mechanism which comprises a telescoping link device 55.

This telescoping link device includes a link section 56 pivotally connected to the upper crank arm 52 and a link section 57 pivotally connected to a bracket structure 58 rigidly secured by welding to the underside of transverse frame member 18. The link section 57 is comprised of a pair of spaced links as best shown in FIG. 6, connected at their telescoping end by upper and lower plates 59 to form a socket which embraces the link section 56 in telescoping relation. The plates 59 are notched, or recessed at their respectively inner sides and a pin 60 is inserted through one of the holes 61 to secure the operative relationship of the link sections 56 and 57 and by means of which the degree of rotative movement of the crank axle may be adjusted according to operating conditions merely by placing the pin 60 in the hole 61 to allow the amount of travel desired to limit the movement in accordance with the amount of vertical adjustment required to position the frame relative to the supporting wheels 36. It will be seen that rotation of the crank axle 40 in the direction of movement which extends the link sections 56 and 57 will be stopped when the pin 60 engages the recess, or notch, provided in the plates 59 and the action limits the lowering movement of the frame structure relative to the supporting wheels.

The hydraulic cylinder 50 acts upon the central area of the crank axle 40 and in order to reduce the stresses in the crank axle and avoid the twisting forces which otherwise would be encountered in transforming the actuating forces from the centrally applied location to the respective wheel mounts 37 a pair of hydraulic cylinders are mounted on the frame structure and operatively connected with the crank axle adjacent to the respective parallel link mechanisms 44 connecting the crank axle to the wheel mounts 37. Hydraulic cylinders 80 are of like construction and capacity and similar to the cylinder mechanisms 50 and are each pivotally connected at one end with the frame structure by means of an abutment bracket 81 rigidly mounted on the transverse frame member 12 by welding and against which the cylinders react in operation. The plungers of the respective cylinders 80 are each pivotally connected with a bracket 82 rigidly mounted at the inner side of the respective link structure 44 and secured thereto by welding. The cylinders 50 and 80 function in unison through suitable hydraulic connections and actuating mechanisms and it will be seen that whereas the cylinder 50 exerts a rotarive force on the crank axle through the medium of the upper crank arm 52 the cylinders 80 will exert a similar rotative force on the crank axle adjacent its respectively opposite ends by means of similarly proportioned crank arms obtained through its connections afforded by the brackets 82 and the parallel links 44. The rotative forces exerted on the crank axle thus are equally proportioned at the center of the axle and adjacent the respective ends thereof thereby to eliminate or reduce the development of undue stress in the crank axle.

FERTILIZER TANK MOUNTING SADDLES

The installation of fertilizer supply tanks on the plow frame and the adaptability of the frame structure to the mounting of such appurtenances thereon is best illustrated in FIGS. 8, 9 and 11 wherein it will be seen that two such tanks 83 and 84 are efficiently received and mounted on the frame structure by means of similar saddle structures 85. The frame structure lends itself quite effectively to the accommodation of the supporting structure for these tanks by the disposition of the various frame elements. The saddles 85 for each tank are separate and are each of one piece construction designed to be supported on spaced frame elements and for this purpose each saddle includes a pair of pedestals 86 spaced apart longitudinally of the frame structure as best indicated in FIG. 11. Each pedestal 86 has a bracketed foot or base 87 which provides means for mounting the saddle structure on the frame structure and for securing the saddle on individual frame elements as by bolts 88. The longitudinally spaced pedestals 86 supporting the saddle 85 mounting the fertilizer tank 83 are mounted respectively on the transverse frame members 21 and 18 at the front and rear of the saddle while the longitudinally spaced pedestals 86 on the saddle 85 supporting the fertilizer tank 84 are mounted respectively on the transverse frame members 22 and 18 at the front and rear of the saddle structure. The bolts 88 secure the pedestal base structure 89 to the several frame members and thus provide rigid supports for the saddles 85 at longitudinally spaced points on the frame. The fertilizer tanks 83 and 84 are securely clamped in place on the saddles by means of rods 89, or the like, extending around the tanks and through holes provided in the saddles where they are secured by nuts threaded onto the ends thereof and tightened to the degree necessary to apply the required clamping force on the tanks. The rods 89 as applied to each fertilizer tank are spaced longitudinally as afforded by the length of the supporting salle, as best shown in FIG. 11.

The tanks 83 and 84 may contain a liquid fertilizer in one tank and anhydrous ammonia in the other tank and these fertilizers are fed from the tanks through suitable hose connections 90 to dispensing and soil compacting devices 91 in accordance with the invention covered in our prior U.S. Pat. No. 3,745,944 of July 17, 1973. The dispensing and soil compacting devices 91 are associated with and mounted on the backside of the mounting bars for the chisel plows 72 and in this position are adapted to dispense the fertilizer directly into the furrows plowed by the chisels 72 and follow through immediately with the covering over and compacting of the soil to seal the fertilizers most effectively into the exact areas where they will provide the greatest benefit and since the entire plow is maintained horizontally level by the mechanisms of the invention the fertilizers will not be lost or scattered by winds or other forces as might result if the plow frame structure and consequently the fertilizer dispensing apparatus were allowed to tilt for any reason thus raising the dispenser 91 out of the soil.

From the foregoing it will be seen that a chisel plow frame structure has been provided of rigid construction and designed for the most efficient application of plowing or cultivating devices thereon in equally spaced relationship and adjustable and capable of supporting and mounting fertilizer dispensing apparatus thereon while providing equally applied operating forces for actuating mechanism to raise or lower the frame structure relative to ground supporting wheels.

What is claimed is:

1. An earth working apparatus having a rigid frame structure mounted on supporting wheels and carrying a plurality of earth working devices, said frame structure comprising front and rear transverse end frame members connected at respectively opposite sides of the frame structure by longitudinally extending side frame members, a pair of longitudinal frame members spaced respectively inwardly from said side frame members at opposite sides of the frame structure connecting said front and rear end frame members to define wheel openings in the frame structure, a transversely disposed frame member spaced inwardly from said rear transverse end frame member and connecting said longitudinal frame members, a pair of transversely extending frame members spaced inwardly from said front transverse end frame member and extending inwardly respectively from said longitudinal frame members at opposite sides of the frame structure and spaced apart at their inner ends upon opposite sides of the longitudinal centerline of the frame structure, a pair of central longitudinally disposed frame members spaced respectively equidistant upon opposite sides of said longitudinal centerline extending between said front and rear transverse end frame members, said transversely disposed frame member and said pair of transversely extending frame members extending through said central longitudinally disposed frame members and all of said frame members being integrated by welding, said supporting wheels being operatively mounted on vertically disposed wheel mounts in said respective wheel openings, a first and second set of parallel links each having a pivotal connection with each said wheel mount and said first set of links having a pivotal connection directly with said frame structure, a crank axle pivotally mounted on the frame structure and connecting the second set of links with the wheel mount said second set of links pivotally mounted on the frame structure by said crank axle in vertically spaced relation to said pivotal connection of the first set of links, a generally vertical crank arm secured to one of the links of said second set of links at each wheel mount, a pair of hydraulic cylinders each pivotally connected at one end thereof to each said crank arm and pivotally connected at their respectively opposite ends on said frame structure whereby to impart a rotative action on said sets of links about their pivotal connections with said frame structure and thereby move said wheel mounts in a vertical direction, said crank axle having a generally vertical crank arm fixed thereto and disposed intermediate said crank arms at said wheel mounts, and a hydraulic cylinder pivotally connected at one end thereof to said crank axle crank arm and pivotally connected at its opposite end on said frame structure whereby to impart a rotative action on said crank axle.

2. An earth working apparatus as set forth in claim 1 wherein a pair of longitudinally disposed fertilizer supply tanks are supported in side-by-side relationship on said frame structure, a pair of longitudinally spaced supporting saddle structures for each of said tanks on said frame structure, each said saddle structure having a pedestal members mounting the respective saddle structures on the frame structure, said pedestal members being spaced apart longitudinally of the frame structure, means connecting the saddle structures under each said tank, one pedestal member for each said tank being supported on and secured to said transversely disposed frame member and one pedestal member for each said tank being supported on and secured to one of said pair of transversely extending frame members, and means binding said fertilizer supply tanks respectively on said saddle structures, said last named means being located substantially coincident with said pedestal members.

3. An earth-working apparatus having a rigid frame mounted on supporting wheels and carrying a plurality of earth-working devices, a draft tongue having a pivotal mounting on said frame adapted to be hitched to a towing vehicle, said draft tongue having an extension thereof inwardly of said frame beyond said pivotal mounting, a vertically disposed wheel mount for each of said supporting wheels, a rotary crank axle mounted transversely on said frame having a horizontal axis, a longitudinally extending link connecting each of said wheel mounts with said rotary crank axle, said links each comprising a crank arm operative from said crank axle, a second longitudinally extending link vertically spaced relative to each of the first links, said second links being parallel to the first links and of the same length as the first links and respectively connecting said wheel mounts with a respectively associated axle mounted on said frame having a horizontal axis in vertical alignment with the axis of said rotary crank axle whereby said respective wheel mounts are constrained to vertical movement in respectively vertical positions throughout their extent of travel between raised and lowered positions, power means to rotate said rotary crank axle whereby said first links comprise laterally spaced crank arms to impart vertical movement of the wheel mounts, said second links acting to maintain the vertical position of each wheel mount during movement between said raised and lowered positions, an upper crank arm provided on the crank axle disposed intermediate said first links, said power means having operative engagement at one end thereof with said upper crank arm to rotate the crank axle, a pivotal connection at the opposite end of the power means on said frame, a telescoping link connection extending between said upper crank arm and said frame to limit rotation of the crank axle in a direction that lowers the frame relative to said wheel mounts to fix the operating height of said earthworking devices for the operations of said apparatus, a depending crank arm centrally disposed on said crank axle, and a link connecting said depending crank arm with said inward extension of said draft tongue to compensate for adjustments in height of the frame to effect normal hitching to said towing vehicle and maintain the frame and draft tongue subtantially level upon rotation of the crank axle, and two additional power means, one located on either side of said first-named power means and each said additional power means connected respectively at one end thereof with a longitudinally extending link connecting said respective wheel mounts with said crank axle, said additional power means being pivotally connected at the respectively opposite end thereof to said rigid frame whereby to impart rotative forces on said crank axle at points spaced on opposite sides of said first-named power means.

* * * * *